No. 875,898. PATENTED JAN. 7, 1908.
M. J. DEELEY & A. E. QUINLAN.
GEARING.
APPLICATION FILED APR. 22, 1907.
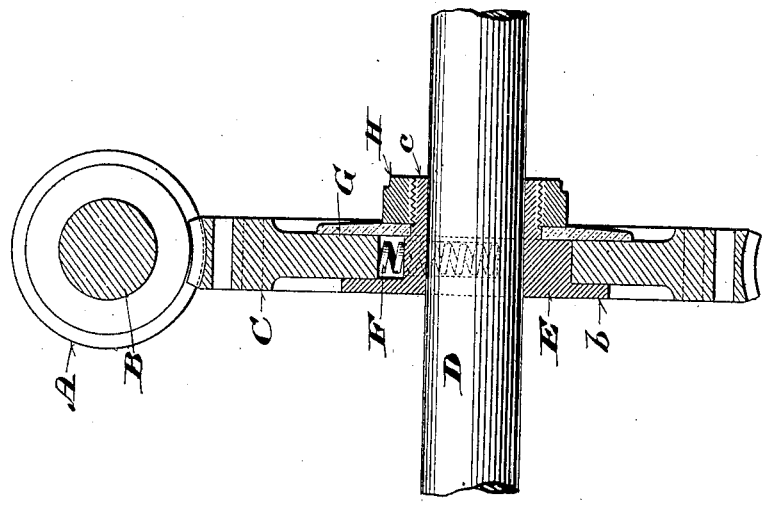
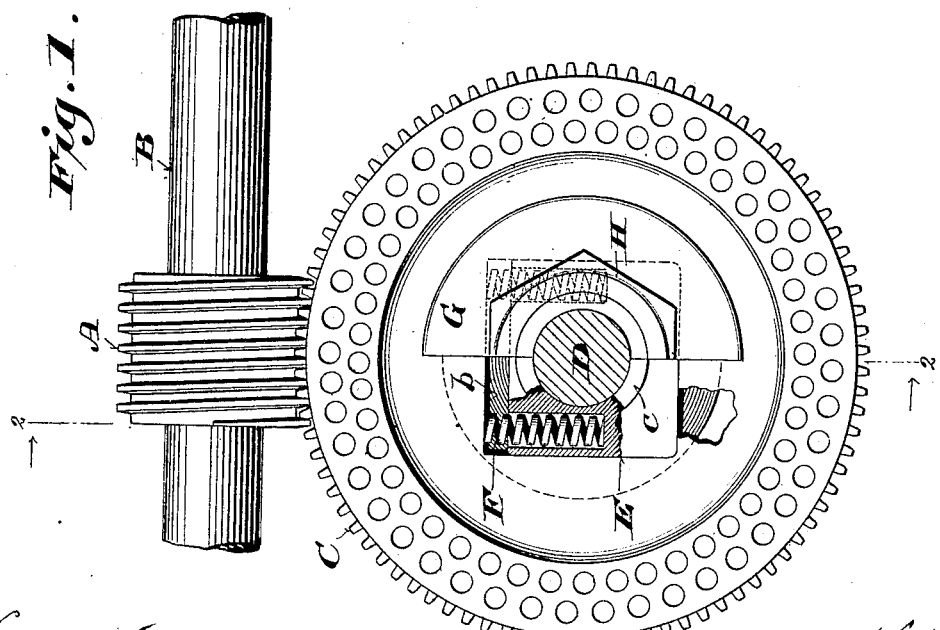

UNITED STATES PATENT OFFICE.

MICHAEL J. DEELEY AND ALFRED E. QUINLAN, OF SHEBOYGAN FALLS, WISCONSIN.

GEARING.

No. 875,898.     Specification of Letters Patent.     Patented Jan. 7, 1908.

Application filed April 22, 1907. Serial No. 369,422.

*To all whom it may concern:*

Be it known that we, MICHAEL J. DEELEY and ALFRED E. QUINLAN, both citizens of the United States, and residents of Sheboygan Falls, in the county of Sheboygan and State of Wisconsin, have invented certain new and useful Improvements in Gearing; and we do hereby declare that the following is a full, clear, and exact description thereof.

The improvements consist in what is herein shown, described and claimed; the object of the invention being to insure accurate meshing of the worm and worm-wheel that have automatic intermittent engagement as parts of a time-wheel mechanism such as is common in spinning mules and jacks, as well as to provide against destruction of the teeth of said wheel at the point of its predetermined initial contact with said worm, and furthermore to provide for shifting the aforesaid wheel to change said point of initial contact with the aforesaid worm whenever necessary or desirable from any cause whatever.

Figure 1 of the accompanying drawings represents a partly sectional plan view of the worm and worm-wheel of a time-wheel mechanism, said wheel and parts in connection therewith being in accordance with our invention. Fig. 2 of said drawings represents a sectional view on the planes indicated by lines 2—2 in Fig. 1.

Referring by letter to the drawings, A indicates the worm, B the worm-shaft, C the worm-wheel, and D the worm-wheel arbor in a time-wheel mechanism to which our improvements relate.

The worm-wheel is provided with a square central opening engaged by a rectangular hub E of less dimension in one direction than said opening, this hub being engaged by said arbor, and provided with sockets engaged by spiral-springs F that oppose a face of the opening aforesaid. The springs are contracted by a sliding movement of the worm-wheel on its hub and expand at the proper time to restore said wheel to normal position concentric with the arbor to which said hub is made fast. An annular flange $b$ of the hub E opposes one side of the worm-wheel C, and opposing the other side of said wheel is a washer G for the passage of an annular screw-threaded extension $c$ of said hub. A nut H is run on the hub-extension against the washer G to secure the worm-wheel in working position.

In practice, the worm A is either swung into engagement with the worm-wheel C, or the latter is likewise engaged with the former, the manner of the engagement being immaterial so far as our invention is concerned. In either case there is yield of said worm-wheel, against resistance of the springs F, to save its teeth from destruction at times of initial contact with the worm, said springs eventually expanding to restore the aforesaid wheel to normal position concentric with the arbor D on which the hub E is arranged.

In case of wear on the part of the teeth of the worm-wheel at its initial point of contact with the worm, or from any cause whatever, it is necessary or desirable to bring other teeth of said wheel to said point of contact, a shift of the aforesaid wheel on its hub may be readily effected, and the general construction and arrangement of parts is such that provision is had for three such shifts, this being a valuable feature of our invention.

We claim:

1. The worm-wheel of a time-wheel mechanism having spring-controlled sliding engagement with its hub to thereby yield to initial contact with the corresponding worm.

2. The worm-wheel of a time-wheel mechanism provided with a square central opening, a rectangular hub for the wheel of less dimension in one direction than the opening aforesaid with which it is engaged, and spiral-springs engaging sockets in said hub to oppose yield of said wheel from normal position.

3. The worm-wheel of a time-wheel mechanism provided with a squared central opening, a rectangular hub for the wheel of less dimension in one direction than the opening aforesaid with which it is engaged and provided with an endless flange opposing one side of said wheel, spiral-springs engaging sockets in the hub to oppose yield of the aforesaid wheel from normal position, a washer engaging an annular screw-threaded extension of said hub against the other side of the worm-wheel, and a nut run on said hub-extension against the washer.

In testimony that we claim the foregoing we have hereunto set our hands at Sheboygan Falls in the county of Sheboygan and State of Wisconsin in the presence of two witnesses.

MICHAEL J. DEELEY.
                 ALFRED E. QUINLAN.

Witnesses:
    O. D. BALLSCHMIDER,
    A. L. LEAVENS.